Figure 14:
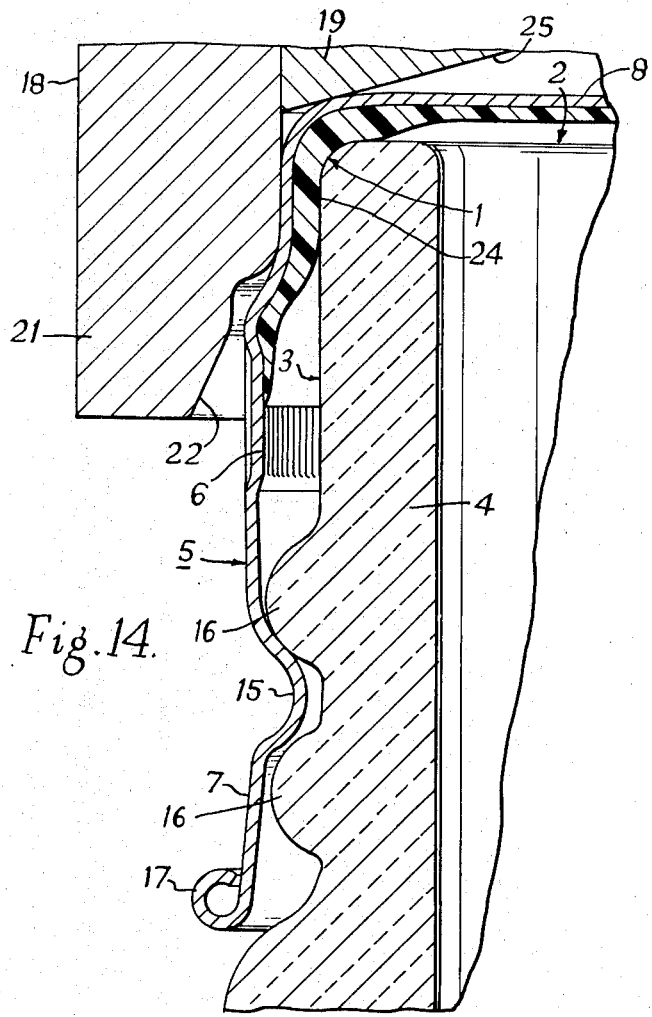

Nov. 23, 1965  R. W. WILTON  3,219,004
CLOSURES
Filed April 19, 1963  4 Sheets-Sheet 1
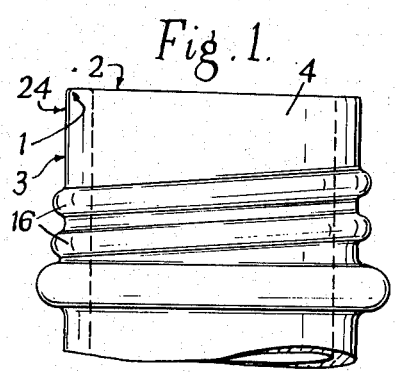
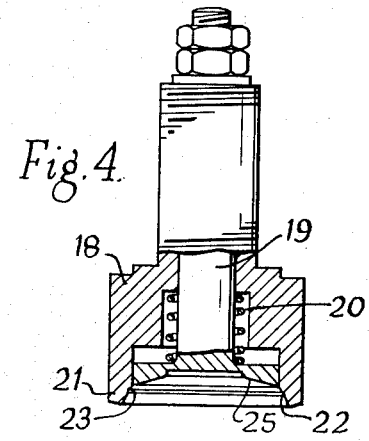
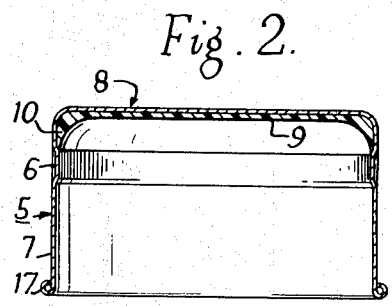
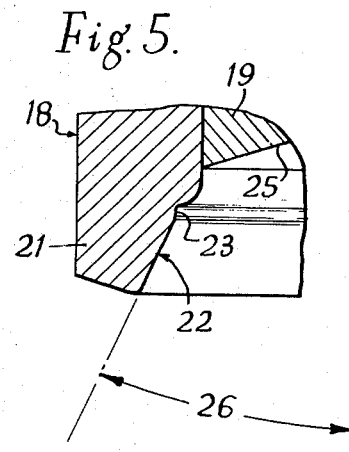
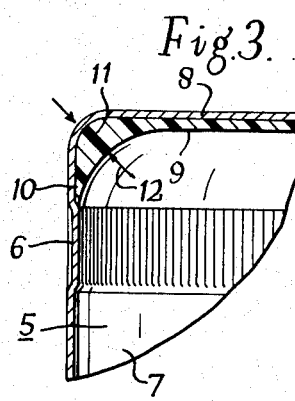
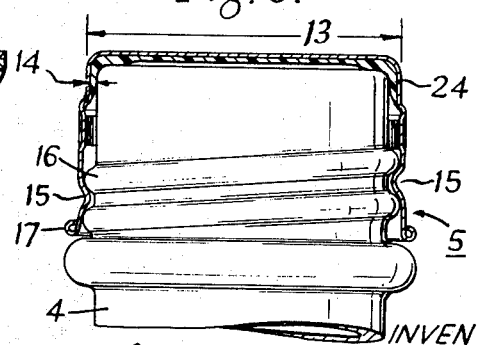
INVENTOR
Ronald William Wilton
BY Wendroth
Linde and Ponack ATTORNEYS

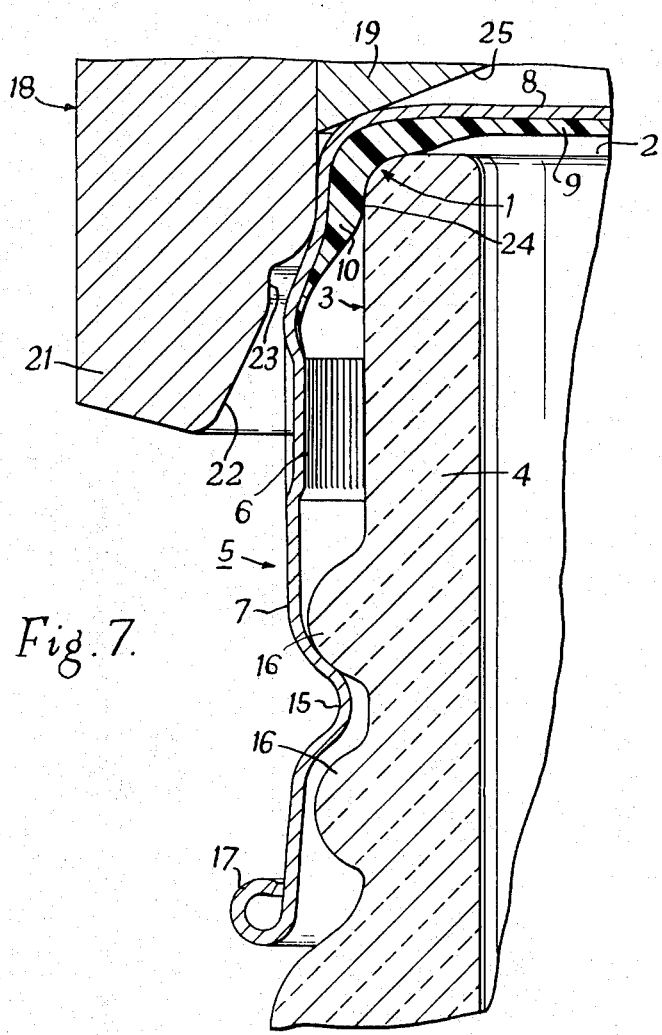

Nov. 23, 1965  R. W. WILTON  3,219,004
CLOSURES
Filed April 19, 1963  4 Sheets-Sheet 3
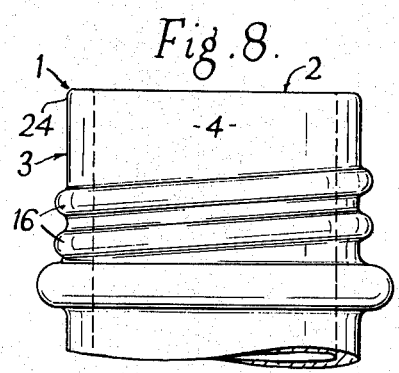
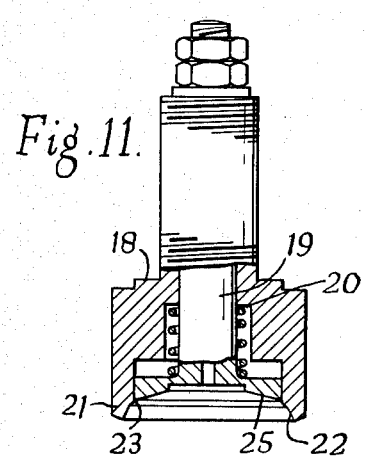
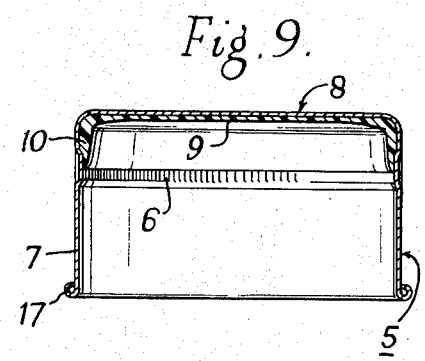
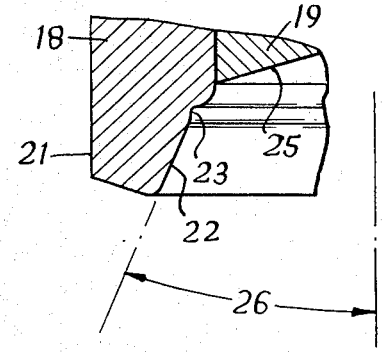
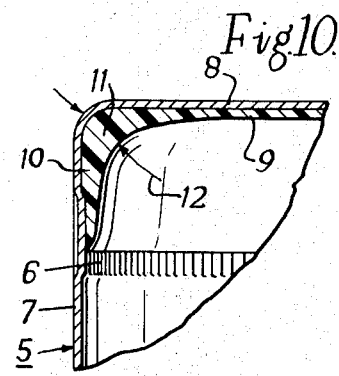
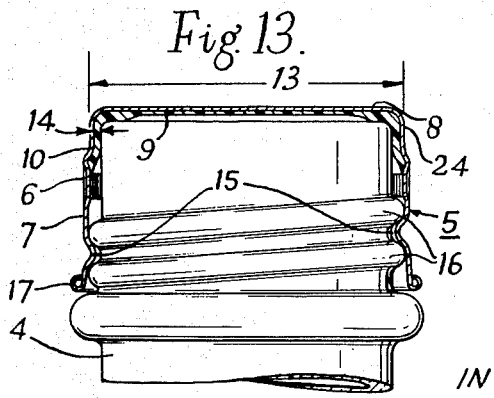
INVENTOR
Ronald William Wilton
BY Wendroth
Lind + Ponack, ATTORNEYS

United States Patent Office 3,219,004
Patented Nov. 23, 1965

3,219,004
CLOSURES
Ronald W. Wilton, West Bromwich, England, assignor to Metal Closures Limited, West Bromwich, England, a British company
Filed Apr. 19, 1963, Ser. No. 274,265
Claims priority, application Great Britain, Apr. 27, 1962, 16,239/62
2 Claims. (Cl. 113—121)

The present invention relates to a method of applying closure seals to containers of the type having an externally threaded neck, such as bottles, jars and cans. The invention also relates to closure blanks for application by the method of the present invention, and to externally screw-threaded containers when sealed by such closure blanks.

The sealing of the mouth of any container by means of a closure seal involves compressing gasket material against a sealing surface on the container. The general practice in the case of externally screw-threaded containers is to form a seal by pressing a gasket against a surface on the top end of the container immediately adjacent to and surrounding the mouth of the container.

In the case of glassware containers, such as bottles and jars, the sealing surface on the top end of the container merges through a radiused corner with a plain, substantially cylindrical surface on the exterior of the container neck above the top end of the thread. In the method of sealing containers provided by the present invention the primary seal is between the sealing gasket and such plain, cylindrical surface and also the radiused corner. Some sealing effect is or may be also provided against the top sealing surface of the container, but this is only secondary to the seal against the side sealing surface.

It is well-known to apply a closure seal to an externally screw-threaded container by placing a closure blank, made of aluminum or like metal and having a cylindrical skirt of greater diameter than the thread, over the top end of the container and then rolling thread into the said skirt to engage with the projecting external thread formations on the container, by inwardly defomring the skirt between adjacent thread ribs on the container by means of thread rollers positioned symmetrically about the container.

In the conventional method of rolling on closure blanks to externally threaded containers outlined above, prior to the thread rolling operation, pressure is applied to the top of the closure blank so as to form a seal between the gasket in the closure blank and a sealing surface on the top end of the container.

It is an object of the present invention to provide a method of forming a more secure seal between the closure cap and the container than can be achieved by the conventional method, which has the disadvantage that the closure has a tendency to resile slightly when the pressure on the top of the closure is released. In the method of the present invention any resiling movement of the closure has less effect on the seal between the closure gasket and the container because it results in relative axial movement between two concentric, substantially cylindrical surfaces, between which the gasket material is compressed, as compared with relative separating movement between two flat surfaces when closures are applied by the conventional method.

According to the present invention a method of sealing a container having an externally screw-threaded neck and a sealing surface on the side of the neck of the container between the thread and the container mouth, comprises placing a closure blank over the mouth of the container, the closure blank having a top and a skirt, the inside surface of the top being covered by a very thin layer of flowed-in gasket material which increases to a thicker annulus of the same material lying in the angle between the top and the skirt, the mean internal diameter of said annular being less than the external diameter of the neck of the container, pressing the closure blank down against the top of the container, and, whilst so held, reducing the diameter of the skirt at a position radially outward of said thicker annulus of gasket material and above the neck thread and in register with the side sealing surface to compress the gasket material between the side sealing surface and the reduced diameter portion of the skirt and forming thread in the skirt by inwardly deforming it.

Perferably the reduction of diamter is effected for a short distance downwardly from the top edge of the skirt and this has the effect of compressing the gasket material both against the cylindrical surface on the outside of the neck and against the radiused corner surface.

The invention also provides a closure blank for application to externally screw-threaded containers made from light gauge alumium sheet and having a top and a substantially cylindrical skirt and containing a gasket formed from a flowed-in viscous composition, said gasket composition forming a very thin layer on the undersurface of the top of the closure blank, whilst in the angle between the top and skirt of the closure blank it is laid in the form of an annulus of greater thickness, the thickness of said annulus, perpendicular to the top, increasing progressively toward the skirt.

A preferred form of closure blank has a flowed-in gasket formed of polyvinyl chloride compound, which is securely bonded to the metal of the closure blank, through an intermediate lacquer, if necessary. The polyvinyl chloride compound is soft and is readily moulded to the contour of the sealing surface by the application pressures. Preferably the gasket material forms a layer of about 0.010 inch on the undersurface of the top of the closure gasket, whilst in the angle between the top and skirt of the closure blank it is laid in the form of an annulus, the surface of which is inclined or the tangent thereof lies at an angle of 40–60° to the surface of the top of the closure. The amount of gasket material laid in the angle of the closure blank depends largely on the purpose for which the closure blank is to be employed; for heavier duty sealing effects the amount of gasket material in said angle is increased, so that not only is it thicker at its thickest point, but it also extends further down the inside of the closure skirt, thus increasing the width of the sealing area between the gasket and the cylindrical surface on the outside of the container neck.

The gasket material is preferably applied as a flowable viscous composition on the middle of the top of the closure blank when inverted. When a predetermined quantity of gasket material is applied in this manner and then the closure blank is spun at a predetermined speed, some of the gasket material spreads out over the undersurface of the top of the closure blank to form a layer whose thickness is governed by the viscosity of the gasket material and the remainder forms an annulus of the desired shape in the angle between the skirt and the top. The gasket material is then cured. Thus, the amount of gasket material supplied will determine the amount in the annulus, whereas the layer on the undersurface of the top will remain substantially constant if the rotational speed to which the closure blank is subjected and the viscosity of the gasket material are maintained substantially constant.

In order that the invention may be more readily understood the application of the invention will be described to closures for maintaining a vacuum seal with reference to FIGS. 1 to 7 of the accompanying drawings, and to those for maintaining a pressure seal with reference to FIGS. 8 to 14 inclusive.

In the drawings:

FIG. 1 is a side elevation of the neck of a bottle to which a closure may be applied for maintaining a vacuum seal, FIG. 2 is a cross section through a suitable form of closure blank, FIG. 3 is an enlarged view of the corner of the closure blank showing the initial disposition of gasket material as spun into position, FIG. 4 is a sectional elevation of a presser block assembly suitable for applying a blank closure of the form shown in FIG. 2, FIG. 5 is an enlarged detail view of the forming surfaces of the pressure block assembly, FIG. 6 is a cross section showing the closure blank according to FIG. 2 applied to a bottle neck of the form shown in FIG. 1, by a presser block assembly of the form shown in FIG. 4, FIG. 7 is an enlarged fragmentary sectional view showing the approximate disposition of the gasket material in the sealed closure, and FIGS. 8 to 14 are views corresponding to FIGS. 1 to 7 respectively, to illustrate the application of the invention for maintaining a pressure seal.

We have found that effective application of closure blanks for maintaining both vacuum and pressure seals can be performed on the same size containers, so that FIGS. 1 and 8 of the drawings are identical. The corner radius 1 at the junction between the top sealing surface 2 and the side sealing surface 3 of the bottle neck 4 is 0.031–0.047 inch, which provides for maximum side sealing effect with a given amount of gasket material and secures the maximum possible holding pressure; this range of corner radii is readily obtainable in standard commercial glassware. Pressure sealing on glassware with a greater radius may be obtained, but this involves the use of more gasket material to give the necessary concentration at the bottle neck corner to provide the required side sealing effect.

It is also possible and preferred to use a closure shell 5 of identical form and size for both vacuum and pressure seals according to this invention. This common closure shell 5 is a pressing made preferably of aluminum sheet, with a thickness of 0.009–0.010 inch. for a 31 mm. neck finish size container, that is, the shell 5 has an external diameter at the side sealing surface of 1.205–1.185 inches; sheet aluminum of slightly less or slightly greater thickness may be employed in some circumstances. The shell 5 is conveniently provided with a reinforcement in the shape of an area or band of knurling 6, which is sunk or recessed into the skirt 7 of the closure shell; the width of the knurled band 6 may be, for example, about 0.1–0.15, say 0.130 inch, the top of the band being about the same distance, that is, about 0.15 inch down the skirt 7 from the crown or top 8 of the shell 5. Accordingly the shells 5 shown in FIGS. 2 and 9 are of identical form.

The angle between the skirt 7 and the top 8 of the closure shell 5 is radiused to about 0.05 inch, and the knurled area, of course, terminates above that part of the skirt in which a thread 15 (FIGS. 6 and 7) is formed in applying it to a container. The depth of the skirt 7 is determined by the extent of the thread 16 on the neck 4 of the bottle and the bottom edge of the skirt 7 terminates in an outwardly curled bead 17.

The knurled area or band 6 also acts as a shoulder to prevent excess spreading of the gasket material when the closure blank is spun to spread said gasket material before curing. Its reinforcing action reduces the distortion of the upper end of the skirt 7 under the action of the thread rollers and thus opposes any tendency to disturb the side seal, which is produced by the reduction of the diameter of the top end of the skirt 7.

The difference between closures for vacuum and pressure seals lies in the amount and distribution of the gasket material employed; for example, in a 31 mm. closure for use in maintaining a vacuum seal 0.55±0.05 grams of polyvinyl chloride has been found suitable, whereas the amount of the same compound in a 31 mm. closure for use in maintaining a pressure seal is 0.65±0.05 grams. In closures for 28 mm. neck finish size bottles the amounts of gasket material for vacuum and pressure seals are 0.44±.005 and 0.52±0105 grams respectively.

The gasket material is allowed to flow into position and because of the difference of amount it settles to provide, between the layer 9 which lies on the underside of the crown or top 8 and the annular layer 10 extending along the interior surface of skirt 7, a somewhat triangular radiused fillet 11 having a radial thickness of 0.030–0.035 inch in a vacuum seal closure blank and of 0.050–0.045 inch in a pressure seal closure blank.

The annulus of gasket material may not always flow into the inside corner of shell 5 to provide a fillet 11 with a well-defined radius 12, but may assume a form in which the general line of its surface is at about 45° to the top 8 and skirt 7 of the closure shell 5.

It will be appreciated that the exact shape and disposition of the triangular annulus of gasket material in the angle between the top 8 and the skirt 7 is not of great importance, since the soft polyvinyl chloride gasket material will flow as the result of reforming operation during application of the closure. It is important, however, that there should be sufficient amount of gasket material in the angle.

The most usual application for closure blanks applied by the method of the present invention is for maintaining a vacuum sealing of containers. It is a well-known technique in vacuum sealing to inject steam into the neck of a container immediately prior to the application of a closure thereto, so that a partial vacuum is set up within the container when the steam condenses. It is also well-known to induce vacuum conditions by hot packing the contents of the container, which upon cooling induces a vacuum. Either or both of these procedures may be employed in vacuum sealing according to this invention.

It will be seen from FIG. 3 that the annular layer 10 of the gasket material terminates in the region of the top of the knurled band 6. When a closure blank of the form exemplified in FIGS. 2 and 3 is applied to standard glassware and is pressed down to form a seal, the resulting closure will satisfactorily maintain a vacuum after the thread 15 is formed in the skirt 7 and the head pressure is released, if the reduction in outside diameter 13 as the top end of the skirt 7 is such that the gasket material is squeezed down to a thickness 14 (FIGS. 6 and 7) of about 0.02 inch.

It has not previously been possible to utilise rolled-on aluminum closures to retain pressures of the order which arise with carbonated soft drinks and with bottled beers during the pasteurisation process, and it has not heretofore been practicable to utilise light gauge metal caps on externally screw-threaded bottles for this purpose. Indeed, it has been the general practice to utilise for this purpose either crown corks, which cannot be used as reclosures after the bottles have been opened, or screw-threaded stoppers, which fit into internally screw-thread bottles, with all their known disadvantages.

However, as already intimated herein the method of the present invention may be employed to sealing closures on bottles, the contents of which develop pressures of up to 120 pounds per square inch, as occurs, for instance, during the pasteurisation of bottled beers. To achieve the desired results it is necessary to provide the greater weight of gasket material as above referred to, in the angle between the skirt 7 and the top 8 of shell 5 and at the same time to reduce the diameter 13 of the top end of the closure skirt 7 to a somewhat greater degree, thus bringing the gasket material into contact with the side sealing surface 3 on the bottle neck 4 over a greater width. From a comparison of FIGS. 9 and 10 which relate to pressure sealing, with the corresponding vacuum sealing FIGS. 2 and 3, it will be seen that on account of the greater amount of gasket material used in pressure sealing, the annular layer 10 extends farther along the skirt 7 so as to overlie part of the knurled band 6. When the closure blank is applied the gasket material not only flows lengthwise of the bottle neck 4 under the axial and radial pressures to which the metal shell 5 is subjected, but also in the circumferential direction so as to make up for any slight ovality and imperfections such as are frequently found in the necks of glass containers.

From the foregoing it will be understood that the amount of gasket material in the angle between the top 8 and skirt 7 of a closure used for pressure sealing is increased by about 50%, as compared with that in a vacuum seal closure, since the amount of gasket material deposited as a coating on the undersurafce of the top 8 remains the same, if the method of applying said gasket material already outlined is utilised.

The operation of reducing the closure diameter 13 is preferably effected before the thread rolling operation and is carried out by means of a two-part presser block, comprising a holder 18 for mounting in a press and supporting a plunger 19 loaded by a spring 20, adapted to apply a predetermined load to the top 8 of a closure shell 5 (FIG. 4 for vacuum sealing; FIG. 11 for pressure sealing). The holder 18 has a skirted outer part 21, which reforms the upper end of the skirt 7 of the closure shell 5 in the desired manner. The skirted outer part 21 of the pressure block holder 18 has a flaring lead-in surface 22 to exert a centering action on the closure shell and a forming surface 23 which is essentially cylindrical, but flares slightly. The diameter of the forming surface 23 is less than the outer diameter of the closure shell 5, which is to be formed thereby, and is preferably about 0.05 inch in excess of the diameter of the cylindrical surface 24 on the bottle neck 4, against which the seal is to be formed, but this depends upon the gauge of the metal of the closure shell 5 and the quantity of gasket material used.

The plunger 19 of the presser block preferably has at its periphery a slightly dished surface 25 to engage against the peripheral portion of the top 8 of shell 5 and form it to a corresponding shape, partly bonding the edge of the top portion downwardly around the radiused corner 1 of the container neck 4.

We have found that a considerable adjustment in total side sealing can be obtained by using the same presser assembly for both vacuum and pressure seals; that is, by varying the total head pressure the side sealing effect can be altered. This is explained by the fact that a certain head load is necessary to reform the aluminum shell and the gasket material to the maximum degree of definition allowed by any given arrangement of pressure block dimensions. If head loads less than this are utilised the result is a partial reforming of the aluminum and the compound. In general head pressures for vacuum sealing are in the range of 200/250 pounds and for pressure sealing in the range of 400/450 pounds; these loadings apply for 31 mm. and 28 mm. closures.

The flared lead-in surface 23 of the presser block holder 18 has an included angle 26 of about 50°; for vacuum seals the plunger 19 is set further back in the holder 18 than for pressure seals (compare FIGS. 5 and 12).

Examples of the reforming of the upper parts of closure shells and the flowing of the gasket material under pressure obtained in closures for use as vacuum seals and as pressure seal are illustrated in FIGS. 7 and 14 respectively. It will be understood that the re-forming of the upper end of the skirt 7 stiffens it and increases the strength of the support of the gasket material which forms the sealing band against the side of the container neck 4. In particular the step at the bottom end of the reduced diameter portion serves an important stiffening function and substantially defines the bottom end of the sealing zone. The distance from the top therefore to which the upper part of the skirt 7 is reformed should be substantially equal to the depth of the side seal, so that the reinforcement provided by the step is substantially coincident with the bottom end of the side sealing zone.

The depth of the side sealing zone required for pressure holding of the order of 110–120 p.s.i. with screw-top containers of external diameters in the range of 25–32 mms. (1–1.25 inches) is found to approximate to 0.09 inch and therefore the reforming of the side wall is effected to a slightly greater distance on the skirt 7, so as to allow for the corner radius 1 on the container 4 and the thickness of the closure top 8. The reduction of the diameter of the upper end of the skirt 7 is such as to squeeze out the soft gasket material of the roughly triangular section annular layer 10 and flow it into a sealing band of the required depth (FIGS. 7 and 14).

With light gauge aluminum caps, flexure of the top 8 of the closure occurs when the contents of the container are under pressure and with sealing against the top sealing surface this flexure tends to break the seal. On the other hand, with side sealing, as employed in the present method, flexure of the closure top 8 under internal pressure only serves to draw in the top of the skirt 7 more tightly against the neck 4 of the container.

With larger sizes of bottles it is necessary to be able to replace the closure and hold the pressure of the residual carbon dioxide. The extensive side sealing provided is a great advantage when the closure is used for resealing after initial opening. There is found to be considerable latitude in the amount of screwing up required to form a sufficient re-seal.

I claim:
1. A method of sealing a container having an externally screw-threaded neck and a sealing surface on the side of the neck of the container between the thread and the container mouth, comprising placing a metal closure blank over the mouth of the container, the closure blank having a top and a skirt, the inside surface of said top being covered by a very thin layer of flowed-in gasket material which increases to a thicker annulus of the same material lying in the angle between said top and said skirt and the mean internal diameter of said annulus being less than the external diameter of said sealing surface on the neck of the container, pressing the closure blank down against said top of the container, while so holding the closure blank, reducing the diameter of said skirt at a position radially outward of said thicker annulus of gasket material and above the neck thread and in register with said side sealing surface to compress said gasket material between said side sealing surface and the reduced diameter portion of said skirt, and thereafter forming thread in said skirt by inwardly deforming it.

2. The method as claimed in claim 1, wherein reduction of diameter in the region of side sealing is effected for a short distance downwardly from the top edge of said skirt, so as to compress said gasket material both against the cylindrical surface on the outside of the neck and against the radiused corner surface thereof.

References Cited by the Examiner
UNITED STATES PATENTS

| | | | |
|---|---|---|---|
| 975,914 | 11/1910 | Werner | 113—121 |
| 1,806,880 | 5/1931 | McManus | 215—40 |
| 1,956,012 | 4/1934 | Egan | 215—40 |
| 2,367,317 | 1/1945 | Thomas | 215—42 X |
| 2,481,111 | 9/1949 | Griswold | 215—40 |
| 2,979,218 | 4/1961 | Stover | 215—40 |
| 3,001,657 | 9/1961 | Gamble | 215—42 |
| 3,047,176 | 7/1962 | Wilckens | 215—40 |

CHARLES W. LANHAM, Primary Examiner.

EARLE DRUMMOND, Examiner.